(12) United States Patent
Montgomery et al.

(10) Patent No.: US 11,533,329 B2
(45) Date of Patent: Dec. 20, 2022

(54) METHODS, SYSTEMS AND COMPUTER READABLE MEDIA FOR THREAT SIMULATION AND THREAT MITIGATION RECOMMENDATIONS

(71) Applicant: Keysight Technologies, Inc., Santa Rosa, CA (US)

(72) Inventors: Garett Michael Montgomery, Cedar Park, TX (US); Xavier Rousseau, Marnes-la-Coquette (FR); Stephen Lee McGregory, Austin, TX (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 194 days.

(21) Appl. No.: 16/586,427

(22) Filed: Sep. 27, 2019

(65) Prior Publication Data
US 2021/0099476 A1 Apr. 1, 2021

(51) Int. Cl.
*H04L 29/06* (2006.01)
*H04L 9/40* (2022.01)

(52) U.S. Cl.
CPC .......... *H04L 63/1433* (2013.01); *H04L 63/02* (2013.01); *H04L 63/1425* (2013.01); *H04L 63/1475* (2013.01); *H04L 63/20* (2013.01)

(58) Field of Classification Search
CPC . H04L 63/1433; H04L 63/1425; H04L 63/02; H04L 63/20; H04L 63/1475
See application file for complete search history.

(56) References Cited

U.S. PATENT DOCUMENTS 6,088,804 A 7/2000 Hill et al.
6,711,127 B1 3/2004 Gorman et al.
(Continued)

FOREIGN PATENT DOCUMENTS

CN 103200230 A 7/2013
CN 103916384 A 7/2014
(Continued)

OTHER PUBLICATIONS

Notice of Allowance and Fee(s) Due and Examiner-Initiated Interview Summary for U.S. Appl. No. 15/585,116 (dated Nov. 27, 2019).
(Continued)

*Primary Examiner* — Joseph P Hirl
*Assistant Examiner* — Thomas A Gyorfi

(57) ABSTRACT

The subject matter described herein includes methods, systems, and computer readable media for threat simulation and threat mitigation recommendations. A method for threat simulation and threat mitigation recommendations includes performing a first threat simulation using at least one attack vector, wherein performing the first threat simulation includes generating simulated network traffic associated with the at least one attack vector and sending, via at least one intermediate node, the simulated network traffic to a test agent in a target network, wherein the test agent is configured to simulate at least one protected asset in the target network; determining, using simulated network traffic arrival metrics, at least one threat mitigation recommendation; and providing, via a user interface, the at least one threat mitigation recommendation to a user.

20 Claims, 9 Drawing Sheets

(56) References Cited

U.S. PATENT DOCUMENTS

| | | |
|---|---|---|
| 6,918,038 B1 | 7/2005 | Smith et al. |
| 6,952,779 B1 | 10/2005 | Cohen et al. |
| 7,013,395 B1 | 3/2006 | Swiler et al. |
| 7,159,237 B2 | 1/2007 | Schneier et al. |
| 7,296,092 B2 | 11/2007 | Nguyen |
| 7,627,891 B2 | 12/2009 | Williams et al. |
| 7,757,293 B2 | 7/2010 | Caceres et al. |
| 7,784,099 B2 | 8/2010 | Benjamin |
| 7,926,113 B1 | 4/2011 | Gula et al. |
| 8,001,589 B2 | 8/2011 | Ormazabal |
| 8,112,016 B2 | 2/2012 | Matsumoto et al. |
| 8,127,359 B2 | 2/2012 | Kelekar |
| 8,230,497 B2 | 7/2012 | Norman et al. |
| 8,256,002 B2 | 8/2012 | Chandrashekhar et al. |
| 8,321,936 B1 | 11/2012 | Green et al. |
| 8,356,353 B2 | 1/2013 | Futoransky et al. |
| 8,365,289 B2 | 1/2013 | Russ et al. |
| 8,413,237 B2 | 4/2013 | O'Rourke et al. |
| 8,490,193 B2 | 7/2013 | Sarraute Yamada et al. |
| 8,650,651 B2 | 2/2014 | Podjarny et al. |
| 8,712,596 B2 | 4/2014 | Scott |
| 8,732,839 B2 | 5/2014 | Hohl |
| 8,737,980 B2 | 5/2014 | Doshi et al. |
| 8,752,183 B1 | 6/2014 | Heiderich et al. |
| 8,813,235 B2 | 8/2014 | Sidagni |
| 8,955,118 B2 | 2/2015 | Franklin |
| 9,015,847 B1 | 4/2015 | Kaplan et al. |
| 9,043,922 B1 | 5/2015 | Dumitras et al. |
| 9,060,239 B1 | 6/2015 | Sinha et al. |
| 9,076,013 B1 | 7/2015 | Bailey, Jr. et al. |
| 9,177,139 B2 | 11/2015 | Hull Roskos |
| 9,183,397 B2 | 11/2015 | Futoransky et al. |
| 9,208,323 B1 | 12/2015 | Karta et al. |
| 9,224,117 B2 | 12/2015 | Chapman |
| 9,270,696 B2 | 2/2016 | Fritzson et al. |
| 9,276,952 B2 | 3/2016 | Simpson et al. |
| 9,292,695 B1 | 3/2016 | Bassett |
| 9,350,753 B2 | 5/2016 | Kaplan et al. |
| 9,367,694 B2 | 6/2016 | Eck et al. |
| 9,467,467 B2 | 10/2016 | Alamuri |
| 9,473,522 B1 | 10/2016 | Kotler et al. |
| 9,558,355 B2 | 1/2017 | Madou et al. |
| 9,760,716 B1 | 9/2017 | Mulchandani |
| 9,774,618 B2 | 9/2017 | Sundhar et al. |
| 9,800,603 B1 | 10/2017 | Sidagni |
| 10,038,711 B1 | 7/2018 | Gorodissky et al. |
| 10,068,095 B1 | 9/2018 | Segal et al. |
| 10,122,750 B2 | 11/2018 | Gorodissky et al. |
| 10,162,970 B2 | 12/2018 | Olson et al. |
| 10,225,276 B2 | 3/2019 | Bort et al. |
| 10,257,220 B2 | 4/2019 | Gorodissky et al. |
| 10,362,048 B2 | 7/2019 | Alexander et al. |
| 10,367,846 B2 | 7/2019 | Gorodissky et al. |
| 10,382,473 B1 | 8/2019 | Ashkenazy et al. |
| 10,395,040 B2 | 8/2019 | Carey et al. |
| 10,412,112 B2 | 9/2019 | Ashkenazy et al. |
| 10,581,802 B2 | 3/2020 | Banerjee et al. |
| 10,958,667 B1 * | 3/2021 | Maida .............. H04L 63/1416 |
| 2003/0195861 A1 | 10/2003 | McClure et al. |
| 2003/0217039 A1 | 11/2003 | Kurtz et al. |
| 2004/0006704 A1 | 1/2004 | Dahlstrom et al. |
| 2004/0015728 A1 | 1/2004 | Cole et al. |
| 2004/0078384 A1 | 4/2004 | Keir et al. |
| 2004/0193918 A1 | 9/2004 | Green et al. |
| 2005/0028013 A1 | 2/2005 | Cantrell et al. |
| 2005/0086502 A1 | 4/2005 | Rayes et al. |
| 2005/0102534 A1 | 5/2005 | Wong |
| 2006/0190228 A1 | 8/2006 | Johnson |
| 2007/0011319 A1 | 1/2007 | McClure et al. |
| 2007/0019769 A1 | 1/2007 | Green et al. |
| 2007/0204347 A1 | 8/2007 | Caceres et al. |
| 2007/0291650 A1 | 12/2007 | Ormazabal |
| 2008/0092237 A1 | 4/2008 | Yoon et al. |
| 2008/0104702 A1 | 5/2008 | Choi et al. |
| 2008/0172479 A1 | 7/2008 | Majanen et al. |
| 2008/0172716 A1 | 7/2008 | Talpade et al. |
| 2008/0209567 A1 | 8/2008 | Lockhart et al. |
| 2008/0256638 A1 | 10/2008 | Russ et al. |
| 2008/0288822 A1 | 11/2008 | Wu et al. |
| 2009/0044277 A1 | 2/2009 | Aaron |
| 2009/0049553 A1 | 2/2009 | Vasudeva |
| 2009/0077666 A1 | 3/2009 | Chen et al. |
| 2009/0106843 A1 | 4/2009 | Kang et al. |
| 2009/0126015 A1 | 5/2009 | Monastyrsky et al. |
| 2009/0172813 A1 | 7/2009 | Aaron |
| 2009/0271867 A1 | 10/2009 | Zhang |
| 2009/0320137 A1 | 12/2009 | White et al. |
| 2010/0138925 A1 | 6/2010 | Barai et al. |
| 2011/0035803 A1 | 2/2011 | Lucangeli Obes et al. |
| 2011/0119765 A1 | 5/2011 | Hering et al. |
| 2011/0124295 A1 | 5/2011 | Mahjoubi Amine et al. |
| 2011/0185432 A1 | 7/2011 | Sandoval et al. |
| 2011/0263215 A1 | 10/2011 | Asplund et al. |
| 2012/0023572 A1 | 1/2012 | Williams, Jr. et al. |
| 2012/0096549 A1 | 4/2012 | Amini et al. |
| 2012/0144494 A1 | 6/2012 | Cole et al. |
| 2012/0174228 A1 | 7/2012 | Giakouminakis et al. |
| 2012/0185944 A1 | 7/2012 | Abdine et al. |
| 2012/0255022 A1 | 10/2012 | Ocepek et al. |
| 2013/0014263 A1 | 1/2013 | Porcello et al. |
| 2013/0031635 A1 | 1/2013 | Lotem et al. |
| 2013/0091539 A1 | 4/2013 | Khurana et al. |
| 2013/0097706 A1 | 4/2013 | Titonis et al. |
| 2013/0227697 A1 | 8/2013 | Zandani |
| 2013/0312081 A1 | 11/2013 | Shim et al. |
| 2013/0347060 A1 | 12/2013 | Hazzani |
| 2013/0347103 A1 | 12/2013 | Veteikis et al. |
| 2014/0007241 A1 | 1/2014 | Gula et al. |
| 2014/0092771 A1 | 4/2014 | Siomina et al. |
| 2014/0137257 A1 | 5/2014 | Martinez et al. |
| 2014/0173739 A1 | 6/2014 | Ahuja et al. |
| 2014/0237606 A1 | 8/2014 | Futoransky et al. |
| 2014/0245443 A1 | 8/2014 | Chakraborty |
| 2014/0259095 A1 | 9/2014 | Bryant |
| 2014/0341052 A1 | 11/2014 | Devarasetty et al. |
| 2014/0380485 A1 | 12/2014 | Ayyagari et al. |
| 2015/0058993 A1 | 2/2015 | Choi et al. |
| 2015/0096026 A1 | 4/2015 | Kolacinski et al. |
| 2015/0143524 A1 | 5/2015 | Chestna |
| 2015/0205966 A1 | 7/2015 | Chowdhury |
| 2015/0207811 A1 | 7/2015 | Feher et al. |
| 2016/0014625 A1 | 1/2016 | Devarasetty |
| 2016/0021056 A1 | 1/2016 | Chesla |
| 2016/0044057 A1 | 2/2016 | Chenette et al. |
| 2016/0080408 A1 | 3/2016 | Coleman et al. |
| 2016/0234188 A1 | 8/2016 | Guan |
| 2016/0234251 A1 | 8/2016 | Boice et al. |
| 2016/0234661 A1 | 8/2016 | Narasimhan et al. |
| 2016/0248800 A1 | 8/2016 | Ng et al. |
| 2016/0275289 A1 | 9/2016 | Sethumadhavan et al. |
| 2016/0342796 A1 | 11/2016 | Kaplan et al. |
| 2016/0352771 A1 | 12/2016 | Sivan et al. |
| 2017/0006055 A1 | 1/2017 | Strom et al. |
| 2017/0013008 A1 | 1/2017 | Carey et al. |
| 2017/0046519 A1 | 2/2017 | Cam |
| 2017/0063886 A1 | 3/2017 | Muddu et al. |
| 2017/0098086 A1 | 4/2017 | Hoernecke et al. |
| 2017/0104780 A1 | 4/2017 | Zaffarano et al. |
| 2017/0116421 A1 | 4/2017 | M C et al. |
| 2017/0126726 A1 | 5/2017 | Han |
| 2017/0195357 A1 | 7/2017 | Sundhar et al. |
| 2017/0279843 A1 | 9/2017 | Schultz et al. |
| 2017/0331847 A1 * | 11/2017 | Alexander .......... H04L 63/1408 |
| 2017/0373923 A1 | 12/2017 | Kazachkov et al. |
| 2018/0018465 A1 | 1/2018 | Carey et al. |
| 2018/0219900 A1 | 8/2018 | Gorodissky et al. |
| 2018/0219901 A1 | 8/2018 | Gorodissky et al. |
| 2018/0219903 A1 | 8/2018 | Segal |
| 2018/0219904 A1 | 8/2018 | Gorodissky et al. |
| 2018/0219905 A1 | 8/2018 | Gorodissky et al. |
| 2018/0219909 A1 | 8/2018 | Gorodissky et al. |
| 2018/0270199 A1 | 9/2018 | Banerjee et al. |
| 2018/0270268 A1 | 9/2018 | Gorodissky et al. |
| 2018/0343278 A1 * | 11/2018 | Vallone .............. H04L 41/0886 |

(56) References Cited

U.S. PATENT DOCUMENTS

| | | | |
|---|---|---|---|
| 2018/0365429 A1 | 12/2018 | Segal | |
| 2019/0014141 A1 | 1/2019 | Segal et al. | |
| 2019/0036961 A1 | 1/2019 | Gorodissky et al. | |
| 2020/0044911 A1* | 2/2020 | Kliger | H04L 63/20 |
| 2021/0035116 A1* | 2/2021 | Berrington | G06F 9/54 |

FOREIGN PATENT DOCUMENTS

| | | |
|---|---|---|
| CN | 104009881 A | 8/2014 |
| CN | 110719212 A | 1/2020 |
| GB | 2588516 A | 4/2021 |
| WO | WO 00/038036 A2 | 6/2000 |
| WO | WO 2004/031953 A1 | 4/2004 |
| WO | WO 2008/054982 A2 | 5/2008 |
| WO | WO 2010/069587 A1 | 6/2010 |
| WO | WO 2013/087982 A1 | 6/2013 |
| WO | WO 2015/111039 A1 | 7/2015 |
| WO | WO 2016/164844 A1 | 10/2016 |
| WO | WO 2018/156394 A1 | 8/2018 |

OTHER PUBLICATIONS

Notice of Allowance and Fee(s) Due for U.S. Appl. No. 14/984,359 (dated May 24, 2017).

Non-Final Office Action for U.S. Appl. No. 14/984,359 (dated Nov. 28, 2016).

Khosroshahy et al., "Botnets in 4G Cellular Networks: Platforms to Launch DDoS Attacks Against the Air Interface," 2013 International Conference on Selected Topics in Mobile and Wireless Networking, Montreal, Canada, DOI: 10.1109/MoWNet.2013.6613793, pp. 1-7 (Aug. 19-21, 2013).

Non-Final Office Action for U.S. Appl. No. 15/585,116 (dated Jul. 12, 2019).

Advisory Action Before the Filing of an Appeal Brief and Applicant-Initiated Interview Summary for U.S. Appl. No. 15/585,116 (dated May 13, 2019).

Final Office Action for U.S. Appl. No. 15/585,116 (dated Mar. 12, 2019).

Non-Final Office Action for U.S. Appl. No. 15/585,116 (dated Oct. 31, 2018).

Marques et al., "Dissemination of Flow Specification Rules," RFC 5575, pp. 1-22 (Aug. 2009).

Lindem et al., "Extensions to OSPF for Advertising Optional Router Capabilities," RFC 4970, pp. 1-13 (Jul. 2007).

"Best Vulnerability Scanner Software," G2, https://www.g2.com/categories/vulnerability-scanner, pp. 1-2 (Downloaded from the Internet 2019).

Harvey, "XM Cyber HaXM: BAS Product Overview and Insight," QuinStreet Inc., pp. 1-6 (Dec. 13, 2018).

Jajodia et al., "Topological Vulnerability Analysis: A Powerful New Approach For Network Attack Prevention, Detection, and Response," Algorithms, Architectures and Information Systems Security, pp. 1-20 (2008).

Search Report under Section 17(5) for Great Britain Application Serial No. 2014705.4 (dated Feb. 22, 2021).

Notice of Allowance and Fee(s) Due for U.S. Appl. No. 15/153,695 (dated Mar. 18, 2019).

Advisory Action for U.S. Appl. No. 15/153,695 (dated Nov. 16, 2018).

Final Office Action for U.S. Appl. No. 15/153,695 (dated Aug. 16, 2018).

Office Action for U.S. Appl. No. 15/153,695 (dated Jan. 19, 2018).

"IxLoad-IPsec Testing," Data Sheet Document No. 915-1769-01 Rev H, Ixia, pp. 1-13 (Aug. 2015).

"IxLoad EPC Wi-Fi Offload Testing," Data Sheet Document No. 915-1796-01 Rev B, Ixia, pp. 1-13 (Apr. 2015).

"Perfectstorm™ 40GE, High-Performance Application and Security Load Modules," Data Sheet Document No. 915-4026-01 Rev B, Ixia, pp. 1-10 (Apr. 2015).

"IxCatapult X800 and X100 Chassis," Data Sheet Document No. 915-2732-01 Rev B, Ixia, pp. 1-4 (Jun. 2014).

* cited by examiner

400

| TYPE (LAYERS) | RECOMMENDATIONS | IMPLEMENTATION |
|---|---|---|
| USER | BLOCK BY INTENT | TRAINING |
| POLICY | BLOCK BY POLICY, EVALUATION | ANTIVIRUS (AV), SECURITY POLICY |
| APPLICATION | BLOCK BY APPLICATION, BYTE STREAM | AV, URL FILTERING, IPS |
| PROTOCOL | BLOCK BY PROTOCOL, BYTE STREAM | WAF, DAF, IPS |
| NETWORK: L4 | BLOCK BY PORT, BYTE STREAM | ACL, IPS, NAT |
| NETWORK: L3 | BLOCK BY IP, BYTE STREAM | ACL, IPS |

| Type | Description | Standard |
|---|---|---|
| FIX | Apply the patch released by the vendor [ms17-010] | MS17-010<br>ISO-27002:2005 6.1.7<br>ISO-27002:2005 10.4.1<br>ISO-27002:2005 12.6.1 |
| REDUCE | Enable IPS signature covering MS17-010 tied to CVE-2017-0143, CVE-2017-0144, CVE-2017-0145, CVE-2017-0146, CVE-2017-0147, CVE-2017-0148<br>  o CheckPoint:<br>    https://www.checkpoint.com/defense/advisories/public/2017/cpai-2017-0177.html<br>  o Fortinet: https://fortiguard.com/encyclopedia/ips/43796<br>  o PaloAlto: https://researchcenter.paloaltonetworks.com/2017/04/unit42-microsoft-windows-smb-server-ms17-010/<br>  o Cisco Sourcefire: https://snort.org/advisories/talos-rules-2017-04-11 | ISO-27002:2005 6.1.7<br>ISO-27002:2005 10.4.1<br>ISO-27002:2005 10.6.2 |
| PREVENT | Make sure to have data backup for business continuity | ISO-27002:2005 10.5.1 |
| PREVENT | Have asset spare to insure business continuity | ISO-27002:2005 14.1.2 |
| REDUCE | Increase filtering and segmentation to reduce malware spreading into your infrastructure: blocking vulnerable service (SMBv1) port 445 | ISO-27002:2005 10.6.1<br>ISO-27002:2005 10.6.2<br>ISO-27002:2005 11.4.5 |
| REDUCE | Add ACL rule into routers | ISO-27002:2005 10.6.1<br>ISO-27002:2005 10.6.2<br>ISO-27002:2005 11.4.5<br>ISO-27002:2005 11.5.1 |
| FIX | Disabled SMBv1 | ISO-27002:2005 10.6.1 |
| REDUCE | Enforce IP reputation and domain reputation | ISO-27002:2005 10.6.2 |
| REDUCE | Increase filtering by blocking every public IP with which one you should not have interaction | ISO-27002:2005 10.6.1<br>ISO-27002:2005 10.6.2<br>ISO-27002:2005 11.4.5 |
| REDUCE | Check anti-malware system is up to date and includes a signature | ISO-27002:2005 10.4.1 |
| PREVENT | Monitor SMB activity to detect suspicious activity. Large scan to internet to detect eventual activity | ISO-27002:2005 10.6.1<br>ISO-27002:2005 10.10 |
| REDUCE | Implement a local fake DNS server to reply to these domains and need http servers listening on 80:<br>  • wwwf.jiuuperfsoxdp9ifjaposdjfhgosurjfaewrwergweal.jcom<br>  • wwwf.jiffexfsodp9ifjaposdjfhgosurjfaewrwergweal.jcom<br>  • wwweb.juuuperfsodp9ifjaposdfjhgosurjfaewrwergweal.jtest | ISO-27002:2005 10.10.2<br>ISO-27002:2005 6.1.7<br>ISO-27002:2005 10.6.1 |
| REDUCE | Enforce data content inspection to detect malicious code or social engineering attempt (phishing) | ISO-27002:2005 10.4.1<br>ISO-27002:2005 10.6.2 |
| PREVENT | Education | ISO-27002:2005 8.2.2 |

| Type | Recommendation | Reference |
|---|---|---|
| FIX | Apply the patch released by the vendor | OWASPTOP10 A.1<br>ISO-27002:2005 6.1.7<br>ISO-27002:2005 10.4.1<br>ISO-27002:2005 12.6.1 |
| REDUCE | Enable IPS signature covering SQL injection and especially those which are covering CVE-XXXX-XXXX | ISO-27002:2005 6.1.7<br>ISO-27002:2005 10.4.1<br>ISO-27002:2005 10.6.2 |
| PREVENT | Make sure to have data backup for business continuity | ISO-27002:2005 10.5.1 |
| REDUCE | Disabled application temporarily | ISO-27002:2005 10.6.1 |
| REDUCE | Disabled service temporarily | ISO-27002:2005 10.6.2 |
| REDUCE | Block the access to the vulnerable web page impacted by this SQL-injection | ISO-27002:2005 10.6.1<br>ISO-27002:2005 10.6.2 |
| REDUCE | Enforce IP reputation and domain reputation | ISO-27002:2005 10.6.1<br>ISO-27002:2005 10.6.2<br>ISO-27002:2005 11.4.5 |
| REDUCE | Increase filtering by blocking every public IP with which one you should not have interaction | ISO-27002:2005 10.6.1<br>ISO-27002:2005 10.6.2<br>ISO-27002:2005 11.4.5 |
| PREVENT | Monitor Web Activity and log to detect suspicious requests. | ISO-27002:2005 10.6.1<br>ISO-27002:2005 10.10 |
| FIX | If you are maintaining the application, follow best practices to deal with SQL injection as described:<br>• https://www.owasp.org/index.php/SQL_Injection<br>• https://www.owasp.org/index.php/SQL_Injection_Prevention_Cheat_Sheet | ISO-27002:2005 10.10.2<br>ISO-27002:2005 12.6.1 |
| PREVENT | Educate developers and administrators | ISO-27002:2005 8.2.2 |

FIG. 7

| | Recommendation | Reference |
|---|---|---|
| PREVENT | Verify if executable file download is allowed into your security policy. Your security policy may disallow executable file as email attachment. | ISO-27002:2005 7.1.3 |
| REDUCE | Enforce content inspection to detect malicious code into executable file: <br> - Host antivirus: for known malicious executable file <br> - IPS signatures: for known exploit and shellcode <br> - Proxy: for network content inspection (antivirus) | ISO-27002:2005 10.4.1 <br> ISO-27002:2005 10.6.2 |
| PREVENT | Increase filtering and segmentation to reduce malware spreading into your infrastructure | ISO-27002:2005 10.6.1 <br> ISO-27002:2005 10.6.2 <br> ISO-27002:2005 11.4.5 |
| REDUCE | Enforce IP reputation and domain reputation: <br> - Proxy in case of HTTP | ISO-27002:2005 10.6.1 <br> ISO-27002:2005 10.6.2 <br> ISO-27002:2005 10.4.1 <br> ISO-27002:2005 11.4.5 |
| REDUCE | Check anti-malware system is up to date | ISO-27002:2005 10.4.1 |
| FIX | Block executable file as email attachment | ISO-27002:2005 10.6.1 <br> ISO-27002:2005 10.6.2 <br> ISO-27002:2005 10.4.1 |
| REDUCE | Do not accept file execution with "administrator" rights (privileges) | ISO-27002:2005 11.2.2 |
| PREVENT | Educate user about acceptable use of assets | ISO-27002:2005 7.1.3 <br> ISO-27002:2005 8.2.2 |

FIG. 8

METHODS, SYSTEMS AND COMPUTER READABLE MEDIA FOR THREAT SIMULATION AND THREAT MITIGATION RECOMMENDATIONS

TECHNICAL FIELD

The subject matter described herein relates to testing networks. More particularly, the subject matter described herein relates to methods, systems, and computer readable media for threat simulation and threat mitigation recommendations.

BACKGROUND

Some network vulnerability scan and asset management tools may identify devices on a target network and analyze device attributes and configuration settings. Based on the analysis of these attributes and configuration settings, an network operator may gain insight into how to more effectively deploy and operate network security assets.

Some network security validation tools may place testing agents within a target network and may use such testing agents to generate and/or monitor malicious simulated network traffic so as to probe the effectiveness of the target network's security tools and assets and report the results.

While both of types of tools can be useful to network operators, such systems require a relatively high level of technical expertise with respect to those tasked with configuring the task and interpreting and acting on the test results. In other words, hackers tend to be highly experienced within the technical domain of their particular attack(s) that they are perpetrating, and at any given time there are potentially many different hackers with many different areas of attack expertise capable of challenging a target network. As such, many network operators find themselves in the position of constantly being confronted with attacks that are launched by entities with attack skills that are more advanced than their own mitigation skills.

SUMMARY

The subject matter described herein includes methods, systems, and computer readable media for threat simulation and threat mitigation recommendations. A method for threat simulation and threat mitigation recommendations includes performing a first threat simulation using at least one attack vector, wherein performing the first threat simulation includes generating simulated network traffic associated with the at least one attack vector and sending, via at least one intermediate node, the simulated network traffic to a test agent in a target network, wherein the test agent is configured to simulate at least one protected asset in the target network; determining, using simulated network traffic arrival metrics, at least one threat mitigation recommendation; and providing, via a user interface (UI), the at least one threat mitigation recommendation to a user.

A system for threat simulation and threat mitigation recommendations includes at least one processor, a memory and a threat simulator implemented using the at least one processor and the memory. The threat simulator is configured for: performing a first threat simulation using at least one attack vector, wherein performing the first threat simulation includes generating simulated network traffic associated with the at least one attack vector and sending, via at least one intermediate node, the simulated network traffic to a test agent in a target network, wherein the test agent is configured to simulate at least one protected asset in the target network; determining, using simulated network traffic arrival metrics, at least one threat mitigation recommendation; and providing, via a UI, the at least one threat mitigation recommendation to a user.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application-specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors and memory.

As used herein, each of the terms "function", "engine", and "module" refers to hardware, firmware, or software in combination with hardware and/or firmware for implementing features described herein.

BRIEF DESCRIPTION OF THE DRAWINGS

Embodiments of the subject matter described herein will now be explained with reference to the accompanying drawings, wherein like reference numerals represent like parts, of which:

FIG. 4 is a diagram illustrating example mitigation recommendations data;

FIG. 5 is a diagram illustrating an example graphical user interface (GUI) for providing threat assessment information;

FIG. 6 is a diagram illustrating example ransomware threat mitigation recommendations data for mitigating a ransomware attack;

FIG. 7 is a diagram illustrating example SQL injection threat mitigation recommendations data for mitigating an SQL injection attack;

FIG. 8 is a diagram illustrating example executable download threat mitigation recommendations data for mitigating an executable download attack.

DETAILED DESCRIPTION

The subject matter described herein includes methods, systems, and computer readable media for threat simulation and threat mitigation recommendations. Network operators generally use network testing to test for various network issues, including security issues. For example, a network operator may want to test how effective their security controls are in protecting assets with respect to known threats or attack vectors. Also, the network operator may want to perform such testing as quickly and efficiently as possible (e.g., without requiring multiple security consultants and experts) and may want to know how to mitigate these threats to the protected asset. Current test systems may fail to meet one or more of these desires.

In accordance with some aspects of the subject matter described herein, techniques, methods, or mechanisms are disclosed for threat simulation and threat mitigation recommendations. For example, a test simulator in accordance with aspects described herein may perform a first threat simulation using at least one attack vector, wherein performing the first threat simulation includes generating simulated network traffic associated with the at least one attack vector and sending, via at least one intermediate node, the simulated network traffic to a test agent in a target network, wherein the test agent is configured to simulate at least one protected asset in the target network; may determine, using simulated network traffic arrival metrics, at least one threat mitigation recommendation; and may provide, via a user interface, the at least one threat mitigation recommendation to a user.

Advantageously, in accordance with some aspects of the subject matter described herein, threat simulation and threat mitigation systems may be improved by using a test agent in a target network that is configured to simulate a protected asset, by using traffic metrics gathered by the test agent and/or various nodes in the target network, and/or by validating a implemented threat mitigation recommendation and providing feedback to a community of users based on the validation. Hence, a threat simulation can be performed in a controlled and safe environment and relevant threat mitigation recommendations may be determined based on the behavior of nodes in the target network as derived or indicated by traffic metrics obtained. Further, by validating implemented threat mitigation recommendations and using community-based feedback mechanisms, users can benefit from more accurate and effective threat mitigation recommendations, e.g., as indicated by other threat simulation users.

Reference will now be made in detail to example embodiments of the subject matter described herein, examples of which are illustrated in the accompanying drawings. Wherever possible, the same reference numbers will be used throughout the drawings to refer to the same or like parts.

Figure 1:
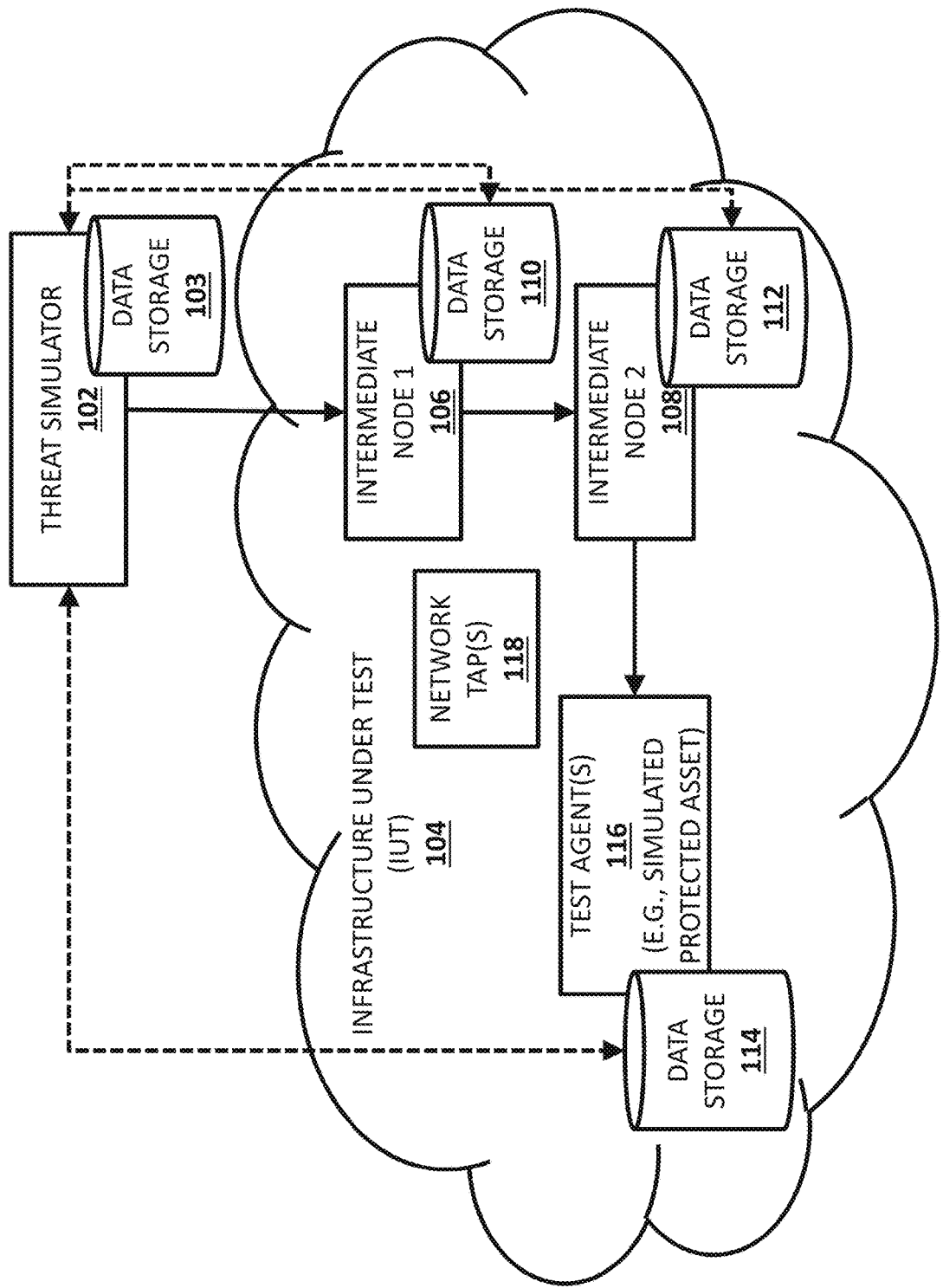
FIG. 1 is a block diagram illustrating an example environment for threat simulation and threat mitigation recommendations.

FIG. 1 is a block diagram illustrating an example communications environment 100 for threat simulation and threat mitigation recommendations. Referring to FIG. 1, communications environment 100 may include a threat simulator 102, a data storage 103, and an infrastructure under test (IUT) 104. Threat simulator 102 may represent any suitable entity (e.g., one or more computing platforms or a testing tool implemented using at least one processor) for performing various aspects associated with performing threat simulation and/or determining threat mitigation recommendation. Threat simulator 102 may include one or more processors, one or more memories, and may include one or more communications interface(s). For example, threat simulator 102 may include a configuration and monitoring interface for communicating with test agent(s) 116 and a second interface for communicating with network tap(s) 118. In another example, a user interface (UI) and/or an application programming interface (API) for allow of a user or other entity to interact with threat simulator 102.

Data storage 103 may represent any suitable entity (e.g., a computer readable medium, a database, a storage device, or memory) for storing threat simulation related data, threat mitigation data, received traffic metrics, testing logic, topology information for IUT 104, and/or other data. For example, data storage 103 may store configuration information sent from a test controller for indicating one or more threat simulations to perform and a schedule for trigger the one or more threat simulations.

IUT 104 may represent various network nodes, equipment, and/or devices associated with an enterprise, a service provider, or another entity. For example, IUT 104 may represent a live or production network controlled or managed by an Internet service provider or a web-based application (e.g., cloud service) provider. IUT 104 may include one or more intermediate nodes (e.g., intermediate nodes 106-108), data storages 110-114, test agent(s) 116, and/or network tap(s) 118.

Each of intermediate nodes 106-108 may represent any suitable entity (e.g., one or more computing platforms or software implemented using at least one processor) for receiving, sending, and/or handling simulated network traffic, for monitoring traffic, and/or for observing network behavior. For example, each of intermediate nodes 106-108 may act as an intermediate hop along a path between threat simulator 102 and test agent(s) 116 during a threat simulation. In this example, each of intermediate nodes 106-108 may be located in IUT 104 and may be configured for selectively filtering, blocking, dropping, modifying, copying, reporting, or redirecting some or all the simulated network traffic (e.g., packets).

In some embodiments, intermediate nodes 106-108 may include an inline network element, a security node, a firewall, a network firewall, an application firewall, an intrusion protection or prevention system (IPS) node, or a network gateway. For example, intermediate node 106 may represent an IPS node with deep packet inspection (DPI) functionality and intermediate node 108 may represent an application firewall.

In some embodiments, intermediate nodes 106-108 and/or related monitoring functionality (e.g., network tap(s) 118) may track various traffic metrics, e.g., jitter, latency, bit rate, and/or other metrics related to the received simulated network traffic associated with a threat simulation. For example, for intermediate node 106, traffic metrics may also indicate when, and if, one or more packets associated with a threat simulation are received at intermediate node 106, if the packets are blocked, discarded, or modified by intermediate node 106, and/or when the packet depart intermediate node 106 toward its destination or a next hop. In another example, for intermediate node 108, traffic metrics may also indicate when, and if, one or more packets associated with a threat simulation are received at intermediate node 108, if the packets are blocked, discarded, or modified by intermediate node 108, and/or when the packet depart intermediate node 108 toward its destination or a next hop Test agent(s) 116 may represent any suitable entity or entities (e.g., one or more computing platforms or software implemented using at least one processor) for communicating with threat simulator 102, for monitoring traffic, and/or for observing network behavior. For example, test agent(s) 116 may act as an endpoint in IUT 104 during a threat simulation and may receive simulated network traffic (e.g., malicious packets) originating from threat simulator 102. In this example, test agent(s) 116 and/or related monitoring functionality (e.g., network tap(s) 118) may track various traffic metrics, e.g., jitter, latency, bit rate, and/or other metrics related to received simulated network traffic associated with a threat simulation. In this example, traffic metrics may also indicate when, and if, one or more packets associated with a threat simulation are received at test agent(s) 116 and/or if any received packet has been modified from an expected packet (e.g., an original version sent by threat simulator 102). In some embodiments, test agent(s) 116 and/or related monitoring functionality may be configured to report various traffic related metrics to threat simulator 102 or a related entity periodically (e.g., every five minutes) or aperiodically (e.g., dynamically, on request, or after a threat simulation is completed).

In some embodiments, test agent(s) 116 may be configured (e.g., by threat simulator 102 or a related test controller) to perform various functions for interacting with nodes in IUT 104, threat simulator 102, and/or other entities. For example, test agent(s) 116 may be configured to simulate a protected asset (e.g., a web application server) in IUT 104. In this example, test agent(s) 116 may replace the protected asset from a topological or connection prospective during a threat simulation or test agent(s) 116 may be located in from of the protected asset, e.g., blocking the protected asset from receiving simulated network traffic and/or responding as the protected asset.

Network tap(s) 118 may represent any suitable entity or entities (e.g., one or more computing platforms or network tap software implemented using at least one processor) for monitoring traffic and/or observing network behavior. For example, a first network tap 118 may monitor network traffic arriving at and/or leaving from intermediate node 106 via a physical or virtual data link and may compute various metrics associated with the network traffic. In this example, a second network tap 118 may monitor network traffic arriving at and/or leaving from intermediate node 108 via a physical or virtual data link and may compute various metrics associated with the network traffic.

In some embodiments, network tap(s) 118 may be configurable by threat simulator 102 or a related test controller to perform various aspects of traffic monitoring and reporting. For example, threat simulator 102 or a related test controller may configure network tap(s) 118 to monitor network traffic and to report various traffic related metrics to threat simulator 102 or a related entity periodically (e.g., every five minutes) or aperiodically (e.g., dynamically, on request, or after a threat simulation is completed).

Each of data storages 110-114 may represent any suitable entity (e.g., a computer readable medium, a database, a storage device, or memory) for storing threat simulation related data, threat mitigation data, received traffic metrics, device configuration information, topology information for IUT 104, and/or other data. For example, each of data storages 110-114 may store traffic monitoring configuration information sent from a test controller or threat simulator 102 for indicating how to identify simulated network traffic and for identify which traffic metrics to gather or generate.

In some embodiments, packet filters and/or analysis logic for monitoring network traffic may be stored in data storages 110-114 and may be provisioned, e.g., by threat simulator 102 or a test controller. For example, at initialization or other suitable times, threat simulator 102 may push or provide packet filters and/or analysis logic to network tap(s) 118 and/or test agent(s) 116 deployed within IUT 104.

In some embodiments, threat simulator 102 may be capable of running various threat simulations. For example, each threat simulation may be based on a predetermined attack vector. In this example, threat simulator 102 may access particular attack vector information from a data structure containing information for a plurality of different attack vectors stored in data storage 103. Continuing with this example, the attack vector information may include message templates, malicious payloads, and/or other information usable for utilizing the corresponding attack vector.

In some embodiments, when performing a threat simulation, threat simulator 102 may generate simulated network traffic (e.g., packets) associated with at least one attack vector and may send, via intermediate node 106 and/or intermediate node 108, the simulated network traffic to a test agent(s) 116 in IUT 104, wherein test agent(s) 116 is configured to simulate at least one protected asset in IUT 104.

In some embodiments, simulated network traffic arrival metrics may be generated by monitoring the arrival of simulated network traffic at one or more entities in IUT 104 (e.g., intermediate nodes 106-108 and/or test agent(s) 116). For example, network taps 118 may be located at or near (e.g., in the path of) each of intermediate nodes 106 and 108. In this example, test agent(s) 116 and/or network taps 118 may be configured to identify when packets or messages arrive or leave a given entity and may generate metrics or other data for analysis by threat simulator 102 or a related entity.

In some embodiments, threat simulator 102 may determine, using simulated network traffic arrival metrics and/or other data from various sources, at least one threat mitigation recommendation. For example, threat simulator 102 or a related entity may use network traffic arrival metrics and/or other data to determine whether malicious packets arrived at intermediate node 106, intermediate node 108, and/or test agent(s) 116. In this example, depending on which nodes did or did not receive the malicious packets as indicated by the arrival metrics and/or other data, threat simulator 102 or a related entity may determine or deduce which if any recommendations are relevant, e.g., intermediate node 108 may needs its configuration adjusted or intermediate node 106 may need to install a particular software or firmware patch.

In some embodiments, threat simulator 102 may provide, via a UI, at least one threat mitigation recommendation to a user. For example, a threat assessment report may be display using a web-based portal via a web browser. In this example, threat mitigation recommendations may be sortable or filterable based on a user selection of a particular threat assessment portion, also referred to as an audit. In some embodiments, threat mitigation recommendations may be based on users and/or expert feedback (e.g., efficacy ratings that are crowd-sourced from a user base or a subset).

In some embodiments, threat simulator 102 or a related entity may provide instructions or a guided walkthrough for implementing one or more threat mitigation recommendations. In some embodiments, e.g., after being approved or selected by a network administrator, threat simulator 102 or a related entity may automatically implement one or more threat mitigation recommendations using scripts, APIs, or other mechanisms.

In some embodiments, after one or more threat mitigation recommendations are implemented, threat simulator 102 or a related entity may validate the one or more threat mitigation recommendations by performing a second threat simulation using a same attack vector and analyzing the effects of the at least one attack vector after the one or more threat mitigation recommendations are implemented; and reporting validation results associated with the second threat simulation. For example, the validation results may indicate that IUT 104 and related nodes are now hardened against a particular attack vector or may indicate that IUT 104 and related nodes are still susceptible to a particular attack vector.

It will be appreciated that FIG. 1 is for illustrative purposes and that various depicted entities, their locations, and/or their functions described above in relation to FIG. 1 may be changed, altered, added, or removed. It will also be appreciated that while intermediate nodes 106-108 are shown in FIG. 1, there could be more or less intermediate nodes.

Figure 2:
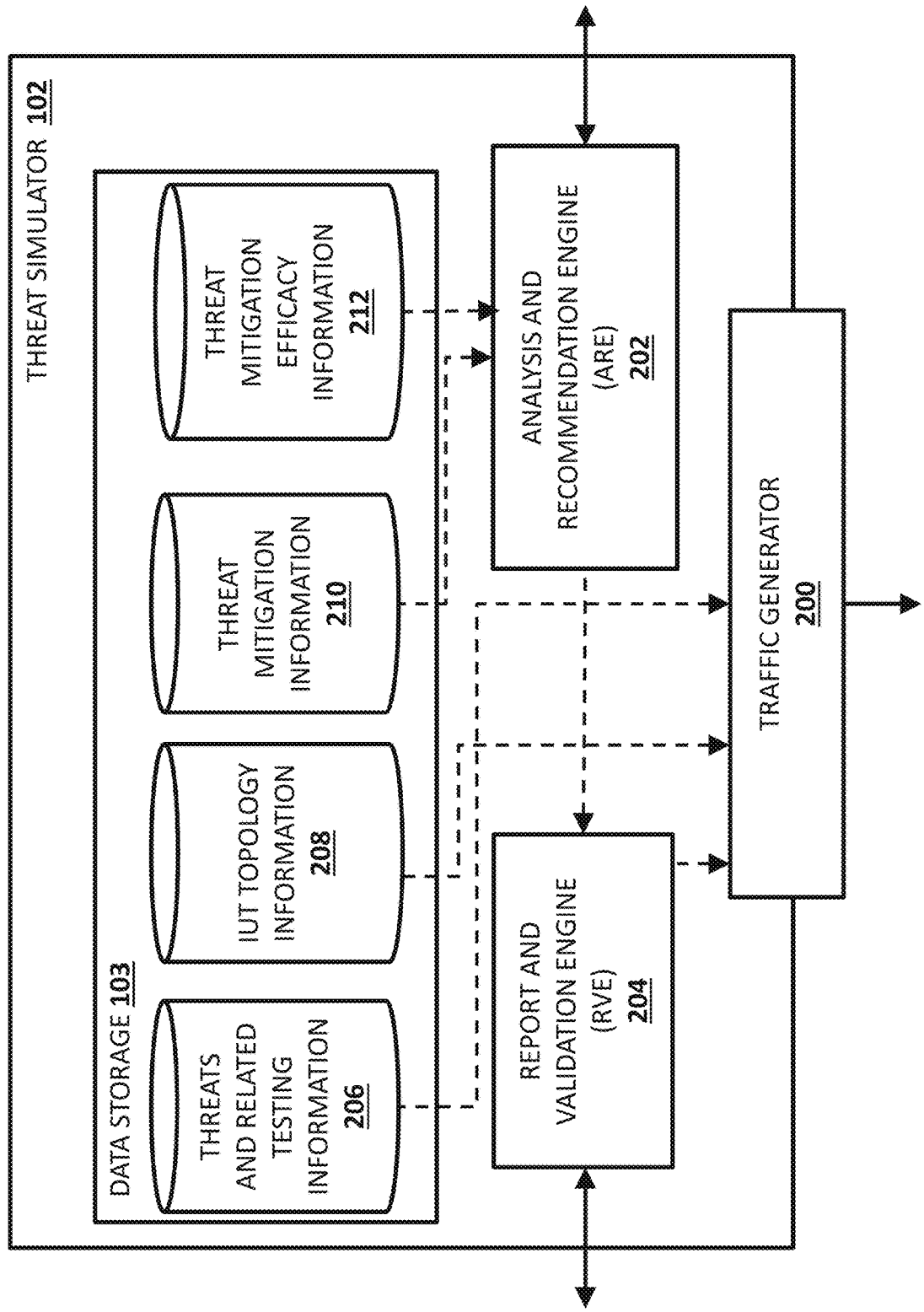
FIG. 2 is a block diagram illustrating an example threat simulator.

FIG. 2 is a block diagram illustrating an example threat simulator 102. Referring to FIG. 2, threat simulator 102 may include a traffic generator 200, an analysis and recommendation engine (ARE) 202, a report and validation engine (RVE) 204, and data storage 103 containing threats 206 (e.g., attack vectors and related testing information), IUT topology information 208 (e.g., network connection information, device information, etc.), threat mitigation information 210 (e.g., threat mitigation recommendation and/or community based feedback ratings), and threat mitigation efficacy information 212 (e.g., computer instructions or code for automatically configuring nodes in IUT 104, a guided walkthrough for human users to configure nodes in IUT 104, a whitepaper describing threat mitigation description, etc.).

Traffic generator 200 may represent any suitable entity or entities (e.g., software executing on at least one processor, a field-programmable gateway array (FPGA), an application-specific integrated circuit (ASIC), or a combination of software, an ASIC, or an FPGA) for performing one or more aspects associated with traffic generation or related functions (e.g., receiving, generating, sorting, analyzing, and/or sending messages, frames, or other data units). For example, traffic generator 200 may be configured to generate simulated network traffic (e.g., packets) for performing a threat simulation associated with one or more attack vectors. In this example, each packet generated may include various data (e.g., malicious payload data) determined using threats 206 and IUT topology information 208, and/or other data provided by a user, data storage 103, and/or other entities.

In some embodiments, traffic generator 200 may include functionality for emulating one or more network nodes or devices during testing of IUT 104. For example, traffic generator 200 may emulate a web server, a smartphone, a computer, or other device that communicates with IUT 104 or an entity therein. In this example, traffic generator 200 may emulate the one or more devices depending on the attack vector being performed.

In some embodiments, traffic generator 200 may use one or more multiple ports (e.g., communications interfaces) for receiving or sending various types of data units, such as Ethernet frames, protocol data units (PDUs), datagrams, user datagram protocol (UDP) messages, transport control protocol (TCP) messages, Internet protocol (IP) version 4 (v4) packets, IP version 6 (v6) messages, stream control transmission protocol (SCTP) messages, real-time transport protocol (RTP) messages, or reliable data protocol (RDP) messages, messages using a tunneling protocol, and/or other data units.

In some embodiments, e.g., in lieu of or in addition to traffic generator 200, communications environment 100 may include multiple, distributed traffic generation agents that are located within IUT 104. In such embodiments, each traffic generation agent may represent a physical or virtual traffic generator and may send simulated network traffic to one or more destinations based on predetermined configuration information, e.g., provider via threat simulator 102 or a test controller.

ARE 202 may represent any suitable entity or entities (e.g., software executing on at least one processor, an FPGA, an ASIC, or a combination of software, an ASIC, or an FPGA) for performing one or more aspects associated with analyzing traffic metrics received from various sources (e.g., intermediate nodes 106-108, test agent(s) 116, and/or network tap(s) 118) and determining one or more threat mitigation recommendations based on the analysis. In some embodiments, ARE 202 may use received traffic metrics from IUT 104 or related nodes and may access threat mitigation information 210 and threat mitigation efficacy information 212 for generating an assessment report and/or threat mitigation recommendations. In such embodiments, the assessment report and/or threat mitigation recommendations may be sent to RVE 204 for displaying to a user or other entity.

RVE 204 may represent any suitable entity or entities (e.g., software executing on at least one processor, an FPGA, an ASIC, or a combination of software, an ASIC, or an FPGA) for performing one or more aspects associated with reporting and validation. For example, RVE 204 may be configured to utilize a UI (e.g., GUI 500) to display or provide threat mitigation recommendations and/or an assessment report. In this example, after a user selects one or more recommendations, RVE 204 may automatically implement one or more threat mitigation recommendations using scripts, APIs, or other mechanisms and/or provide a guided walkthrough or advice for helping a user to implement the recommendation. In some embodiments, RVE 204 may validate a threat mitigation recommendations by performing a second threat simulation using a same attack vector and analyzing the effects of the attack vector; and reporting validation results associated with the second threat simulation. For example, by triggering a same threat simulation (e.g., re-running a previous simulation), RVE 204 may receive and use reported or obtained traffic metrics to determine whether IUT 104 is still susceptible to the same attack. In this example, if RVE 204 determines that an implemented recommendation was unsuccessful at mitigating the attack, RVE 204 may determine whether that recommendation was implemented correctly and/or suggest other recommendations to implement for mitigating the attack. Continuing with this example, RVE 204 may also use validation results to automatically provide feedback to a community based feedback mechanism for the recommendation, e.g., by lowering or increasing a efficacy rating depending on the determined validation results.

In some embodiments, threats and related testing information 208 may represent one or more data structures containing attack vectors, threat simulation logic, and/or other information for simulating an attack on IUT 104. For example, threats and related testing information 208 may include attack vector information, e.g., message templates, malicious payloads, and/or other information usable for utilizing the corresponding attack vector. In some embodiments, threats and related testing information 208 or related data may be manually provisioned, e.g., one or more threat simulations may be based on reported attacks from other users, where behavior, packets, and/or other data is provided to threat simulator 102 or a related system.

In some embodiments, IUT topology information 208 may represent one or more data structures containing composition information, network topology information, network connectivity information, device configuration information, and/or network link configuration information associated with IUT 104. For example, IUT topology information 208 may include information network elements, network element configuration information, inter-device link information, link protocol information, application identifying information, access control list information, and network administrator identifying information, etc. In some embodiments, IUT topology information 208 or related data may be manually provisioned or may be automatically detected and provisioned via scanning IUT 104 using scripts, network discovery protocols or other mechanisms.

In some embodiments, threat mitigation information 210 may represent one or more data structures containing various types of threat mitigation recommendations and related information usable for mitigating different threats. For example, threat mitigation information 210 may include threat mitigation recommendation information, network element configuration and/or related settings, IPS configuration and/or related settings, firewall configuration and/or related settings, internal data handling procedure recommendations, network or administrative security procedures, application settings, network element operating system configuration and/or related settings, etc. In some embodiments, threat mitigation information 210 or related data may be manually provisioned (e.g., by paid experts and/or a community of users) or may be automatically determined based on effective threat mitigation recommendations for one or more similar threats.

In some embodiments, threat mitigation recommendation information may include instructions for adjusting a network topology, instructions for changing inter-device connections and/or connection protocols, instructions for deploying additional network elements (e.g., network security devices), instructions for deploying network services to mitigate a security threat, and/or instructions for removing network devices or network services which are impairing or have the potential to impair security of the network with respect to a security threat.

In some embodiments, threat mitigation efficacy information 212 may represent one or more data structures containing rating, rankings, and/or other metrics for indicating effectiveness of implemented threat mitigation recommendations. For example, threat mitigation efficacy information 212 may include ratings based on feedback from paid experts and/or a community of users.

It will be appreciated that FIG. 2 is for illustrative purposes and that various depicted entities, their locations, and/or their functions described above in relation to FIG. 2 may be changed, altered, added, or removed. For example, in some embodiments, RVE 204 and ARE 202 may be combined into a single module. It will also be appreciated that various entities in FIG. 2 may obtain or access any relevant data, including various types of data described above.

Figure 3:
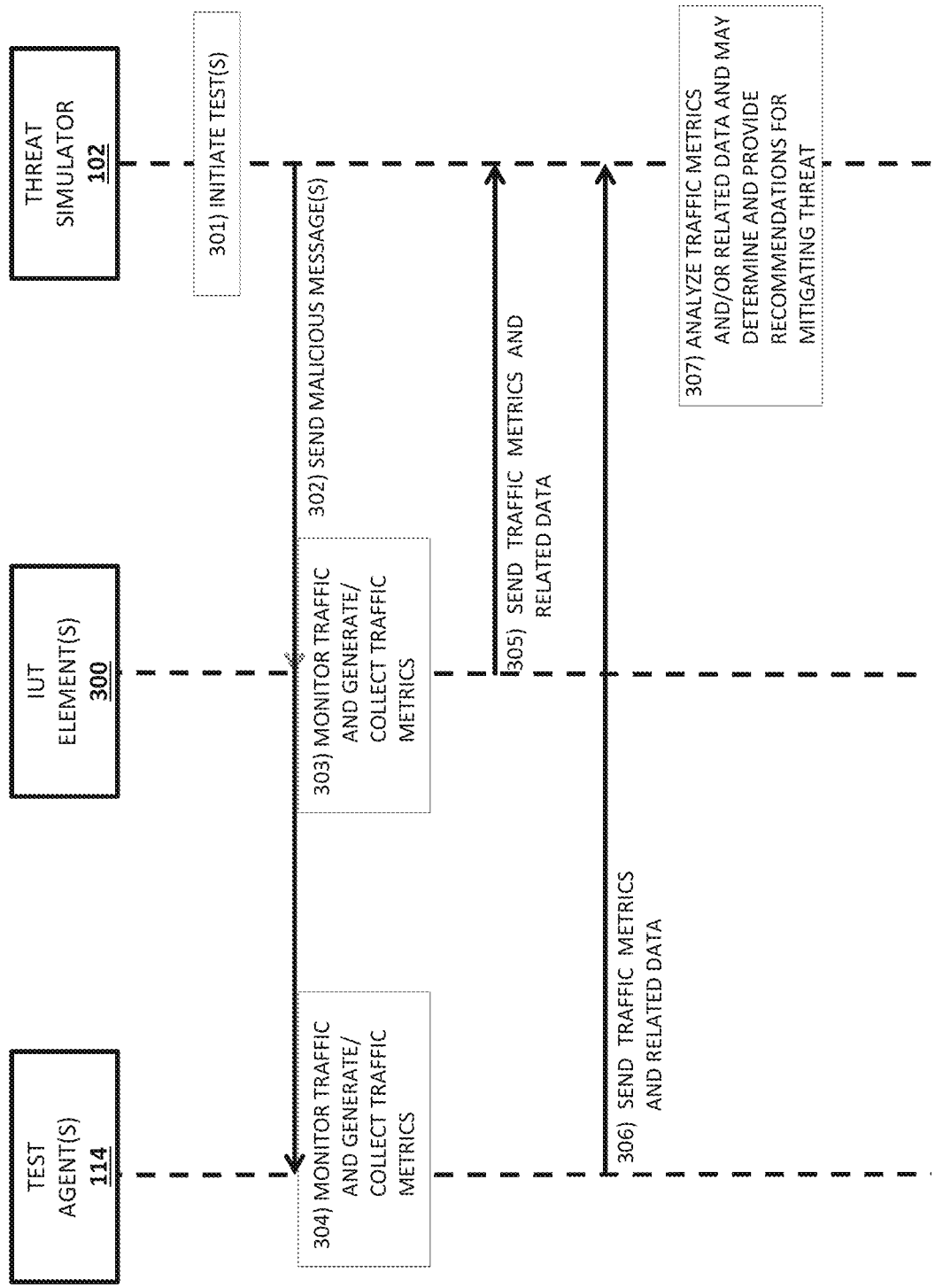
FIG. 3 is a message flow diagram illustrating a threat simulator performing a threat simulation.

FIG. 3 is a message flow diagram illustrating messages for performing a threat simulation. In some embodiments, simulated network traffic may be received and/or monitored by IUT element(s) 300 (e.g., physical or virtual entities in IUT 104). IUT element(s) 300 may represent any suitable entity or entities that receive, process, forward, and/or interact with simulated network traffic during a threat simulation. For example, IUT element(s) 300 may include intermediate nodes 106 and 108 and/or network tap(s) 118 and may be capable of modifying (e.g., to remove malicious data) and/or for blocking simulated network traffic. In this example, IUT element(s) 300 may also include or utilize functionality that can monitor traffic and related attributes (e.g., the time of arrival for packets associated with simulated network traffic, the time of transmission (e.g., forwarding) for packets associated with simulated network traffic, and/or changes that are made by a given element) and may generate various metrics (e.g., simulated network traffic arrival metrics, simulated network traffic departure metrics, error metrics, attack detection metrics, etc.) associated with the monitored traffic.

In some embodiments, e.g., prior to a particular threat simulation, threat simulator 102 or a related entity (e.g., a test controller) may send configuration information to test agent(s) 116 for configuring the behavior of the test agent. For example, for a given threat simulation, test agent(s) 116 may be configured to act as a web server with a particular set of services and/or protocols active and, for another threat simulation, test agent(s) 116 may be configured to act as a storage area network (SAN) node with a different set of services and/or protocols active.

In some embodiments, threat simulator 102 or a related entity (e.g., a test controller) may also instruct test agent(s) 116 with regard to what messages to send and/or when to send those messages. For example, in a threat simulation involving a user clicking a malicious link in a web browser, test agent(s) 116 may be configured to initiate the threat simulation by requesting a payload associated with that link from threat simulator acting as a web server. In another example, in a threat simulation involving a remote actor performing an SQL injection attack, test agent(s) 116 may be configured to respond to an initial web server request sent by threat simulator 102 as the web server test agent(s) 116 is configured to simulated would.

Referring to FIG. 3, in step 301, threat simulator 102 may initiate a threat simulation, e.g., requested or directed by a user or a related test controller. For example, threat simulator 102 or a related entity therein may be instructed to perform threat simulation in response to a user selecting an particular threat assessment to be performed via web-based management GUI. In this example, simulated network traffic generated may access threats 206 for obtaining an attack vector or related data.

In step 302, one or more malicious messages (e.g., a web server request for exploiting an SQL injection vulnerability, a message containing a malicious executable file, or for trigger ransomware from being downloaded and installed) may be sent from threat simulator 102 toward test agent(s) 116.

In step 303, IUT element(s) 300 may monitor simulated network traffic originating from threat simulator 102 and may generate or collect traffic metrics associated with the simulated network traffic. For example, IUT element(s) 300 may log times indicating when simulated network traffic packets arrived at a given element and/or may generate related arrival time stamps or other metrics. In another example, IUT element(s) 300 may inspect received simulated network traffic packets to determine whether malicious data portions have been removed, altered, or mitigated.

In step 304, test agent(s) 116 may monitor simulated network traffic originating from threat simulator 102 and may generate or collect traffic metrics associated with the simulated network traffic. For example, test agent(s) 116 may log when simulated network traffic packets arrived at a test agent(s) 116 and may generate related arrival time stamps or other metrics. In another example, test agent(s) 116 may inspect received simulated network traffic packets to determine if malicious data portions have been removed, altered, or mitigated.

In step 305, IUT element(s) 300 may send traffic metrics and/or other data to threat simulator 102 or related entity. For example, traffic metrics and/or other data may indicate jitter, latency, bit rate, and/or other metrics related to received simulated network traffic associated with a threat simulation. In this example, the traffic report may also indicate when, and if, one or more packets associated with a threat simulation are received at an element, if the packets are blocked, discarded, or modified by the element, and/or when the packet depart the element toward its destination.

In step 306, test agent(s) 116 may send traffic metrics and/or other data to threat simulator 102 or a related entity. For example, traffic metrics and/or other data may indicate jitter, latency, bit rate, and/or other metrics related to received simulated network traffic associated with a threat simulation. In this example, traffic metrics and/or other data may also indicate when, and if, one or more packets associated with a threat simulation are received at test agent(s) 116 and/or if any received packet has been modified from an expected packet (e.g., an original version sent by threat simulator 102).

In step 307, threat simulator 102 or a related entity may receive and analyze traffic metrics and/or other data and may generate and provide one or more recommendations for mitigating a threat associated with a threat simulation. For example, threat simulator 102 or a related entity may generate an threat assessment report indicating whether particular audit (e.g., test portions) were failed by IUT 104 or entities therein and may include one or more threat mitigation recommendations for mitigating (e.g., fix, prevent, or reduce) effects of the related threat or audit.

It will be appreciated that FIG. 3 is for illustrative purposes and that various depicted messages and details for reporting network testing results described above in relation to FIG. 3 may be changed, altered, added, or removed.

FIG. 4 is a diagram illustrating example threat mitigation recommendations data 400. In some embodiments, threat mitigation recommendations data 400 may be accessed and/or stored by threat simulator 102, test agent(s) 116, and/or other entities using various data structures. In some embodiments, threat mitigation recommendations data 400 may include any suitable information, such as categories, types, or layers associated with recommendations and related recommendations, and implementation information. For example, each threat mitigation recommendation may be based on a device (e.g., node or element) class (e.g., firewall), a particular device or equipment model, an open systems interconnection (OSI) network layer model, or another reference model for classifying threat types. In this example, each threat mitigation recommendation may also be associated with one or more recommendations and/or one or more recommendation types. Continuing with this example, each threat mitigation recommendation may also be associated with implementation information for implementing a related mitigation.

Referring to FIG. 4, threat mitigation recommendations data 400 is depicted using a table representing associations between recommendation types, recommendations, and implementation information. In some embodiments, threat mitigation recommendations data 400 may be stored or maintained in one or more memories (e.g., data storage 103) in communications environment 100. As depicted in FIG. 4, each row represents a threat mitigation recommendation type, example recommendations associated with the mitigation recommendation type, and example implementation or related information.

In some embodiments, threat mitigation recommendations may be associated with different recommendation types. In some embodiments, threat mitigation recommendation types may be usable for classifying and/or filtering threat mitigation recommendations based on scope (e.g., generic, service-specific, application-specific, vulnerability-specific), effect or purpose (e.g., fix, reduce, prevent), or other factors.

For example, a generic recommendation type may focus on the perimeter of the attack service and may include recommendations such as: enforce data content inspection, enable structured query language injection signature checking in an IPS, or set more restrictive source filtering in order to reduce the range of a possible attack source. In another example, a service-specific recommendation type may focus on a service (e.g., a network service) or a network layer and may include recommendations such as: disable server message block (SMB) service, restrict SMB file sharing access, or block access to a vulnerable web page. In another example, an application-specific recommendation type may focus on an application (e.g., an operating system or a web-based application) and may include recommendations such as: apply patch for Microsoft Windows operating system or apply application patch if available on vendor website, e.g., http://www.wordpress.org. In another example, a vulnerability-specific recommendation type may focus on a vulnerability tied to an application version or a particular environment condition and may include recommendations such as: apply patch for 'MS17-019' provided by Microsoft or apply patch to fix an SQL injection exploit in WordPress version '2.5.3'.

Example implementation information may include administration instructions and/or configuration instructions associated with one or more of intermediate nodes 106-108. In some embodiments, implementation information may be usable by a human operator (e.g., human-readable step-by-step instructions for configuration adjustments) and/or usable by a management system or related software for automatically performing a related recommendation, e.g., by configuring intermediate nodes 106 and 108 via a configuration script and/or an API.

In some embodiments, threat mitigation recommendations data 400 may also include feedback based on users and/or other experts. For example, as recommendations are implemented and validated by users, users may provide feedback (e.g., an efficacy rating from 1-5 stars) indicating the effectiveness of the recommendation based on the user's experience. In this example, subsequent users may be able to view or access this feedback to make more informed decisions regarding which mitigation recommendations to use. In another example, threat mitigation recommendations data 400 may also include rankings indicating how often a mitigation recommendation is used. In this example, threat simulated or related entity (e.g., a web-based UI) may include functionality for tracking how often users and/or experts (e.g., paid consultants) select and/or implement various threat mitigation recommendations.

It will be appreciated that threat mitigation recommendations data 400 in FIG. 4 is for illustrative purposes and that different and/or additional information may also be stored or maintained. For example, each threat mitigation recommendation may include a unique reference number for identification purposes. Further, it will be appreciated that threat mitigation recommendations data 400 may be stored in various data structures, memories, media, data storages, and/or in one or more locations.

Figure 5:
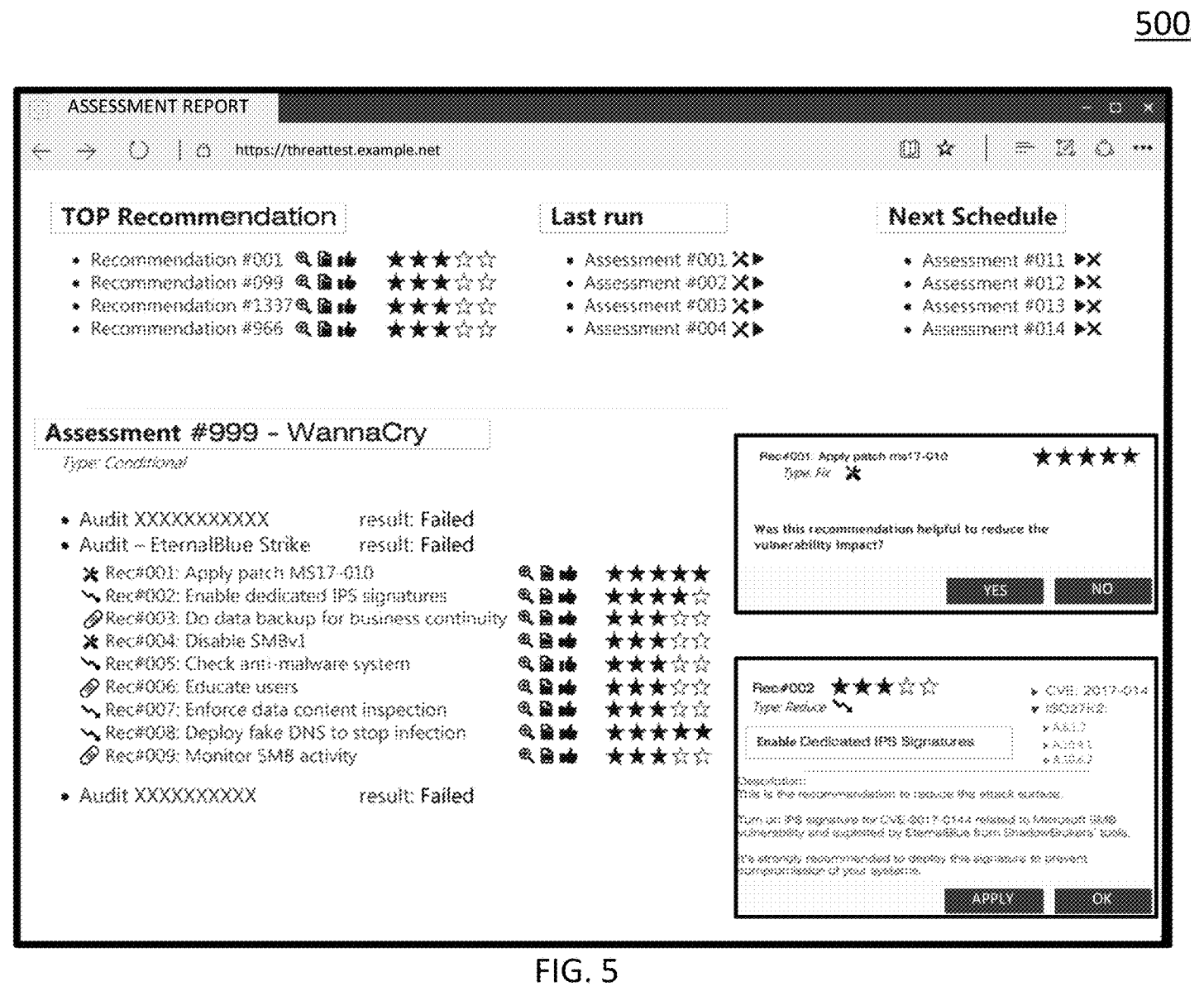

FIG. 5 is a diagram illustrating an example GUI 500 for providing threat assessment information. In some embodiments, GUI 500 may represent a page provided by a web-based management portal or a user application usable for configuring threat simulator 102 or related entities and/or for reviewing threat simulation results, e.g., assessment information. For example, GUI 500 may provide an assessment report with various details and metrics (e.g., grades) indicating how IUT 104 or related entities (e.g., intermediate nodes 108 and 110) behaved or performed during the simulated attack. In this example, GUI 500 may indicate which, if any, aspects of the attack were prevented or stopped or how effective existing conditions (e.g., device configurations) were in preventing or stopping the attack.

In some embodiments, GUI 500 may provide recommendations and related information for a given threat assessment associated with a threat simulation. In such embodiments, GUI 500 may provide UI elements for allowing a user to review details about recommendations and/or to select one or more recommendations for implementation, e.g., automatically or via a guided walkthrough or setup.

Referring to FIG. 5, GUI 500 may include groups of UI elements for displaying, inputting, or interacting with various types of data associated with threat assessment and/or related information.

GUI 500 may provide a list of top recommendations for a user. In some embodiments, the top recommendations may be crowd-sourced (e.g., based on feedback from multiple users) and/or based on known characteristics of the user, IUT 104, or current assessment(s). For example, the listing of top recommendations may change dynamically, e.g., in response to simulated attacks and/or related threat assessments (e.g., failed assessments).

GUI 500 may provide a list of 'last run' (e.g., previous performed) assessments (e.g., simulated attacks) and may provide a list on 'next scheduled' (e.g., next to be performed) assessments. In some embodiments, GUI 500 may provide action-triggering icons beside each assessment listed, e.g., a start icon for starting or restarting a corresponding assessment and a stop icon for stopping a corresponding assessment.

In some embodiments, GUI 500 may provide a more detailed description of a selected assessment. For example, as depicted in FIG. 5, an assessment '#999-WannaCry' may represent a particular attack vector related to ransomware and may indicate a list of audits performed during the assessment, where each audit may represent a different aspect of the assessment. In this example, GUI 500 may indicate a result for each audit, e.g., 'Failed' or 'Passed'.

In some embodiments, GUI 500 may provide a list of recommendations for a failed audit. Each recommendation may be associated with a recommendation type, e.g., prevent, fix, or reduce. GUI 500 may also provide a number of 'action' icons for each recommendation, where each icon may trigger a different action. For example, a magnifying glass icon may trigger GUI 500 to display a message box or a window that provides recommendation details and/or an example of the recommendation. A document icon may trigger GUI 500 to display a message box or a window that provides recommendation materials, e.g., a picture, a guideline, a whitepaper, etc. A thumbs up icon may trigger GUI 500 to increase a metric associated with a recommendation's efficiency (e.g., by updating a recommendation ranking or rating) associated with a corresponding recommendation. In some embodiments, GUI 500 may provide a number of stars for indicating community feedback and may be updated dynamically or periodically as remote users provide feedback, e.g., 1 star rating may indicate that a recommendation is unpopular or ineffective, while 5 star rating may indicate that a recommendation is very popular or effective.

It will be appreciated that FIG. 5 and its related description are for illustrative purposes and that additional and/or different UI elements may be usable for displaying, inputting, or interacting with threat assessment information.

FIG. 6 is a diagram illustrating example ransomware threat mitigation recommendations data 600 for mitigating a ransomware (e.g., 'WannaCry') attack. In some embodiments, threat mitigation recommendations data 600 may be accessed and/or stored by threat simulator 102, test agent(s) 116, and/or other entities using various data structures. Referring to FIG. 6, threat mitigation recommendations data 600 is depicted using a table representing associations between recommendation types, recommendations, and reference numbers. In some embodiments, threat mitigation recommendations data 600 may be stored or maintained in one or more memories (e.g., data storage 103) in communications environment 100. In some embodiments, threat mitigation recommendations data 600 may be provided (e.g., via a client application or web-based GUI) to a user if IUT 104 or nodes therein are deemed susceptible to a ransomware attack.

It will be appreciated that threat mitigation recommendations data 600 in FIG. 6 is for illustrative purposes and that different and/or additional information may also be stored or maintained.

FIG. 7 is a diagram illustrating example SQL injection threat mitigation recommendations data 700 for mitigating an SQL injection attack on a web server. In some embodiments, threat mitigation recommendations data 700 may be accessed and/or stored by threat simulator 102, test agent(s) 116, and/or other entities using various data structures. Referring to FIG. 7, threat mitigation recommendations data 700 is depicted using a table representing associations between recommendation types, recommendations, and reference numbers. In some embodiments, threat mitigation recommendations data 700 may be stored or maintained in one or more memories (e.g., data storage 103) in communications environment 100. In some embodiments, threat mitigation recommendations data 700 may be provided (e.g., via a client application or web-based GUI) to a user if IUT 104 or nodes therein are deemed susceptible to an SQL injection attack.

It will be appreciated that threat mitigation recommendations data 700 in FIG. 7 is for illustrative purposes and that different and/or additional information may also be stored or maintained.

FIG. 8 is a diagram illustrating example executable download threat mitigation recommendations data 800 for mitigating an executable download attack (e.g., via email and/or hypertext transfer protocol (HTTP)). In some embodiments, threat mitigation recommendations data 800 may be accessed and/or stored by threat simulator 102, test agent(s) 116, and/or other entities using various data structures. Referring to FIG. 8, threat mitigation recommendations data 800 is depicted using a table representing associations between recommendation types, recommendations, and reference numbers. In some embodiments, threat mitigation recommendations data 800 may be stored or maintained in one or more memories (e.g., data storage 103) in communications environment 100. In some embodiments, threat mitigation recommendations data 800 may be provided (e.g., via a client application or web-based GUI) to a user if IUT 104 or nodes therein are deemed susceptible to an executable download attack.

It will be appreciated that threat mitigation recommendations data 800 in FIG. 8 is for illustrative purposes and that different and/or additional information may also be stored or maintained.

Figure 9:
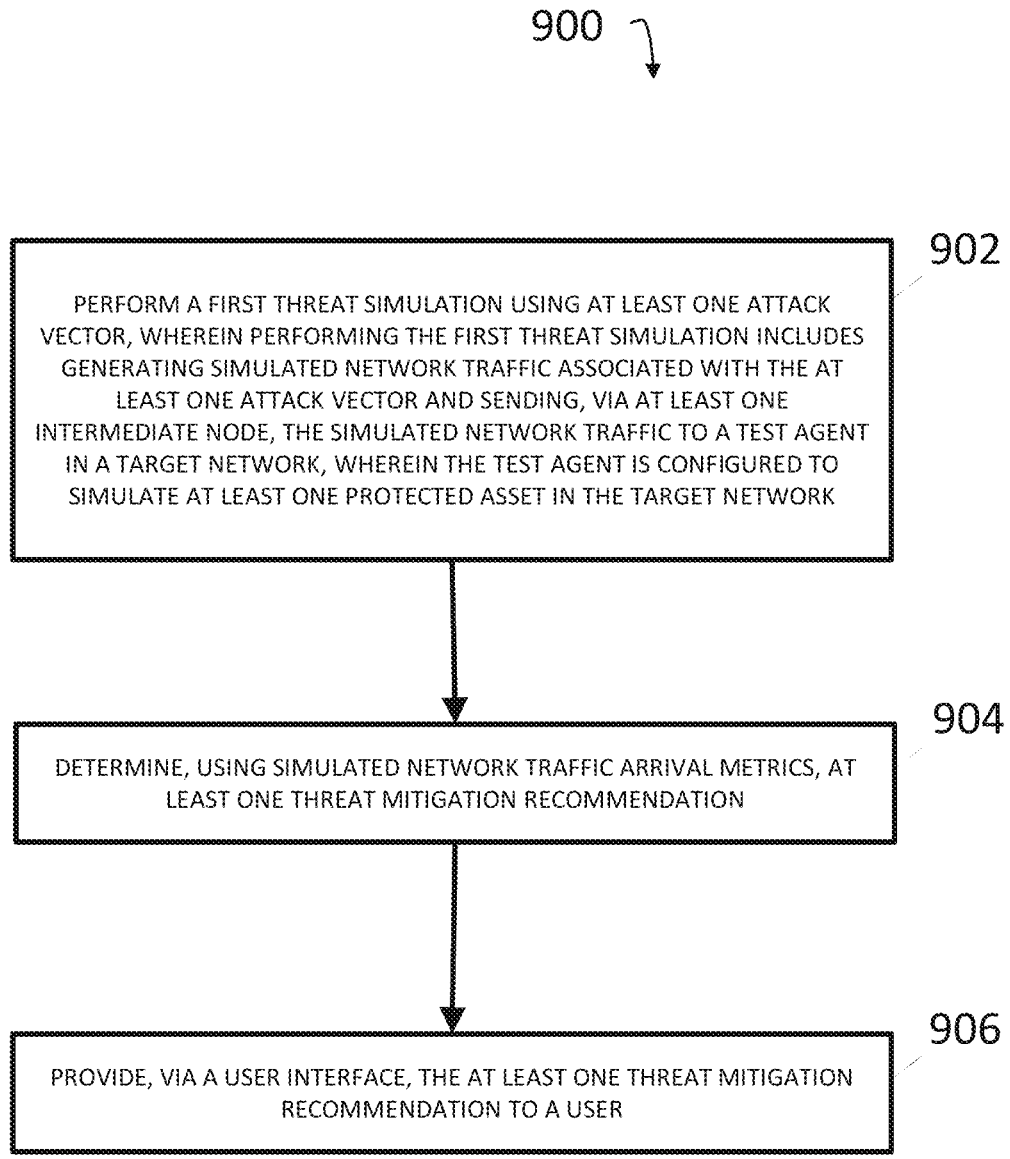
FIG. 9 is a flow chart illustrating an example process for threat simulation and threat mitigation recommendations.

FIG. 9 is a diagram illustrating an example process 900 for threat simulation and threat mitigation recommendations. In some embodiments, process 900, or portions thereof, may be performed by or at threat simulator 102, test agent(s) 116, and/or another node or module. In some embodiments, process 900 may include steps 902, 904, 906, and/or 908.

Referring to process 900, in step 902, a first threat simulation using at least one attack vector may be performed. In some embodiments, performing a first threat simulation may include generating simulated network traffic with at least one attack vector and sending, via at least one intermediate node, the simulated network traffic to a test agent in a target network, wherein the test agent may be configured to simulate at least one protected asset in the target network.

In step 904, at least one threat mitigation recommendation may be determined using simulated network traffic arrival metrics. For example, threat simulator 102 or a related entity (e.g., ARE 202) may use network traffic arrival metrics received from various sources to determine whether malicious packets arrived at intermediate node 106, intermediate node 108, and/or test agent(s) 116. In this example, depending on which nodes did or did not receive the malicious packets as indicated by the metrics, threat simulator 102 or a related entity (e.g., ARE 202) may determine or deduce which if any recommendations are relevant, e.g., intermediate node 108 may needs its configuration adjusted.

In step 906, the at least one threat mitigation recommendation may be provided to a user via a UI. For example, a threat assessment report may be provided via a web-based UI, e.g., GUI 500.

In some embodiments, determining at least one threat mitigation recommendation may include using target network topology information of the target network. For example, threat simulator 102 or a related entity (e.g., ARE 202) may use IUT topology information 208 when determining relevant mitigation recommendations (e.g., tactics, techniques, policies, etc.) to present to a user. In this example, the threat mitigation recommendations may be based at least in part on the path of devices traversed in IUT 104 for packets, e.g., changing settings or enabling features of one or more intermediate nodes 106 and 108.

In some embodiments, the at least one threat mitigation recommendation may be stored in a data structure containing threat mitigation recommendations associated with different intermediate nodes and/or threat mitigation recommendations associated with different intermediate node classes.

In some embodiments, at least one intermediate node may include an inline network element, a security node, a firewall, a network firewall, an application firewall, an IPS node, or a network gateway.

In some embodiments, at least one threat mitigation recommendation determined in process 900 may be associated with at least one intermediate node, may include administration instructions and/or configuration instructions for the at least one intermediate node, and/or may include an associated crowd-sourced metric, e.g., rating or rank.

In some embodiments, simulated network traffic arrival metrics may be generated by monitoring the arrival of simulated network traffic at one or more entities in IUT 104 (e.g., intermediate nodes 106 and 108 and/or test agent(s) 116). For example, network taps 118 may be located at or near (e.g., (in the path of) each of intermediate nodes 106 and 108. In this example, test agent(s) 116 and/or network taps 118 may be configured to identify when packets or messages arrive or leave a given entity and may generate metrics or other data for analysis by threat simulator 102 or a related entity (e.g., ARE 202).

In some embodiments, a test agent may be in the target network in a manner that is topologically similar to a protected asset. For example, a protected asset may be a production web server behind an application firewall and an IPS node in IUT 104. In this example, test agent 116 may simulate the web server's functionality during threat simulations and may also be or appear to be located in IUT 104 like the web server, e.g., located behind the application firewall and the IPS node.

In some embodiments, at least one threat mitigation recommendation may be stored in a data structure accessible via an API or a UI. For example, threat mitigation information 210 in data storage 103 may be accessible using a representational state transfer (REST) API or a web-based UI.

In some embodiments, process 900 may further include performing, using the at least one threat mitigation recommendation, a mitigation for mitigating effects of the at least one attack vector; validating the at least one threat mitigation recommendation by performing a second threat simulation using the at least one attack vector and analyzing the effects of the at least one attack vector using simulated network traffic arrival metrics; and reporting validation results associated with the second threat simulation.

It will be appreciated that process 900 is for illustrative purposes and that different and/or additional actions may be used. It will also be appreciated that various actions described herein may occur in a different order or sequence.

It should be noted that threat simulator 102, test agent(s) 116, and/or functionality described herein may constitute a special purpose computing device. Further, threat simulator 102, test agent(s) 116, and/or functionality described herein can improve the technological field of network testing, including, e.g., threat assessments and related threat mitigation recommendations. For example, threat simulator 102 may effectively test IUT 104 against multiple attack vectors in a safe and controlled manner, e.g., by using test agent 116 configured to simulate a protected asset as a destination or endpoint for a simulated attack. Further, threat simulator 102 may determine and provide relevant threat mitigation recommendations for various threat simulations by using simulation results (e.g., assessments) and/or traffic metrics. Also, threat simulator 102 may validate an implemented threat mitigation recommendation by re-running the same threat simulation after the recommendation is implemented for IUT 104 or related entities.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for threat simulation and threat mitigation recommendations, the method comprising:

performing a first threat simulation using at least one attack vector, wherein performing the first threat simulation includes generating simulated network traffic associated with the at least one attack vector and sending, via at l act one a plurality of intermediate nodes, the simulated network traffic to a test agent in a target network, wherein the test agent is configured to simulate at least one protected asset in the target network;

determining, using simulated network traffic arrival metrics, at least one threat mitigation recommendation, wherein determining the at least one threat mitigation recommendation includes analyzing a first portion of the simulated network traffic arrival metrics associated with a first intermediate node of the plurality of intermediate nodes and a second portion of the simulated network traffic arrival metrics associated with a second intermediate node of the plurality of intermediate nodes and in response to the analyzing of the first portion and the second portion, determining that the first intermediate node requires threat mitigation and that the second intermediate node does not require threat mitigation, and determining a first recommendation of the at least one threat mitigation recommendation for mitigating threats at the first intermediate node; and providing, via a user interface, the at least one threat mitigation recommendation to a user, wherein the at least one threat mitigation recommendation includes an associated crowd-sourced efficacy rating or ranking.

2. The method of claim 1 wherein determining the at least one threat mitigation recommendation includes using target network topology information of the target network.

3. The method of claim 1 wherein the at least one threat mitigation recommendation is stored in a data structure containing threat mitigation recommendations associated with different intermediate nodes and/or threat mitigation recommendations associated with different intermediate node classes.

4. The method of claim 1 wherein at least one of the plurality of intermediate nodes includes a security node, a firewall, a network firewall, an application firewall, an intrusion protection or prevention system (IPS) node, or a network gateway.

5. The method of claim 1 wherein the at least one threat mitigation recommendation includes administration instructions and/or configuration instructions for at least one intermediate node of the plurality of intermediate nodes.

6. The method of claim 1 wherein the simulated network traffic arrival metrics are generated by monitoring the arrival of simulated network traffic at the plurality of intermediate nodes and/or the test agent.

7. The method of claim 1 wherein the test agent is in the target network in a manner that is topologically similar to the protected asset.

8. The method of claim 1 wherein the at least one threat mitigation recommendation is stored in a data structure accessible via an API or user interface.

9. The method of claim 1 comprising:
performing, using the at least one threat mitigation recommendation, a mitigation for mitigating effects of the at least one attack vector;
validating the at least one threat mitigation recommendation by performing a second threat simulation using the at least one attack vector and analyzing the effects of the at least one attack vector using simulated network traffic arrival metrics; and
reporting validation results associated with the second threat simulation.

10. A system for threat simulation and threat mitigation recommendations, the system comprising:
at least one processor;
a memory; and
a threat simulator implemented using the at least one processor and the memory, wherein the threat simulator is configured for:
performing a first threat simulation using at least one attack vector, wherein performing the first threat simulation includes generating simulated network traffic associated with the at least one attack vector and sending, via a plurality of intermediate nodes, the simulated network traffic to a test agent in a target network, wherein the test agent is configured to simulate at least one protected asset in the target network;

determining, using simulated network traffic arrival metrics, at least one threat mitigation recommendation, wherein determining the at least one threat mitigation recommendation includes analyzing a first portion of the simulated network traffic arrival metrics associated with a first intermediate node of the plurality of intermediate nodes and a second portion of the simulated network traffic arrival metrics associated with a second intermediate node of the plurality of intermediate nodes and in response to the analyzing of the first portion and the second portion, determining that the first intermediate node requires threat mitigation and that the second intermediate node does not require threat mitigation, and determining a first recommendation of the at least one threat mitigation recommendation for mitigating threats at the first intermediate node; and providing, via a user interface, the at least one threat mitigation recommendation to a user, wherein the at least one threat mitigation recommendation includes an associated crowd-sourced efficacy rating or ranking.

11. The system of claim 10 wherein the threat simulator is configured for determining the at least one threat mitigation recommendation using target network topology information of the target network.

12. The system of claim 10 comprising a data structure containing threat mitigation recommendations associated with different intermediate nodes and/or threat mitigation recommendations associated with different intermediate node classes.

13. The system of claim 10 wherein at least one of the plurality of intermediate nodes includes a security node, a firewall, a network firewall, an application firewall, an intrusion protection or prevention system (IPS) node, or a network gateway.

14. The system of claim 10 wherein the at least one threat mitigation recommendation includes administration instructions and/or configuration instructions for at least one intermediate node of the plurality of intermediate nodes.

15. The system of claim 10 comprising at least one network tap configured for monitoring the arrival of simulated network traffic at the plurality of intermediate nodes and/or the test agent and generating the simulated network traffic arrival metrics.

16. The system of claim 10 wherein the test agent is in the target network in a manner that is topologically similar to the protected asset.

17. The system of claim 10 wherein the at least one threat mitigation recommendation is stored in a data structure accessible via an API or user interface.

18. The system of claim 10 wherein the threat simulator is further configured for:
performing, using the at least one threat mitigation recommendation, a mitigation for mitigating effects of the at least one attack vector;
validating the at least one threat mitigation recommendation by performing a second threat simulation using the at least one attack vector and analyzing the effects of the at least one attack vector using simulated network traffic arrival metrics; and reporting validation results associated with the second threat simulation.

19. A non-transitory computer readable medium having stored thereon executable instructions that when executed by at least one processor of at least one computer cause the at least one computer to perform steps comprising:
  performing a first threat simulation using at least one attack vector, wherein performing the first threat simulation includes generating simulated network traffic associated with the at least one attack vector and sending, via a plurality of intermediate nodes, the simulated network traffic to a test agent in a target network, wherein the test agent is configured to simulate at least one protected asset in the target network;
  determining, using simulated network traffic arrival metrics, at least one threat mitigation recommendation, wherein determining the at least one threat mitigation recommendation includes analyzing a first portion of the simulated network traffic arrival metrics associated with a first intermediate node of the plurality of intermediate nodes and a second portion of the simulated network traffic arrival metrics associated with a second intermediate node of the plurality of intermediate nodes and in response to the analyzing of the first portion and the second portion, determining that the first intermediate node requires threat mitigation and that the second intermediate node does not require threat mitigation, and determining a first recommendation of the at least one threat mitigation recommendation for mitigating threats at the first intermediate node; and
  providing, via a user interface, the at least one threat mitigation recommendation to a user, wherein the at least one threat mitigation recommendation includes an associated crowd-sourced efficacy rating or ranking.

20. The non-transitory computer readable medium of claim 19 wherein determining the at least one threat mitigation recommendation includes using target network topology information of the target network.

* * * * *

UNITED STATES PATENT AND TRADEMARK OFFICE
CERTIFICATE OF CORRECTION

PATENT NO. : 11,533,329 B2
APPLICATION NO. : 16/586427
DATED : December 20, 2022
INVENTOR(S) : Garett Michael Montgomery et al.

Page 1 of 1

It is certified that error appears in the above-identified patent and that said Letters Patent is hereby corrected as shown below:

In the Claims

In Column 16, Line 61, in Claim 1, after "via" delete "at I act one".

Signed and Sealed this
Twentieth Day of June, 2023

Katherine Kelly Vidal
*Director of the United States Patent and Trademark Office*